US011603208B2

(12) United States Patent
LeBlanc-Dear

(10) Patent No.: US 11,603,208 B2
(45) Date of Patent: Mar. 14, 2023

(54) EVACUATION SYSTEM

(71) Applicant: Jennifer Elaine LeBlanc-Dear, Zachary, LA (US)

(72) Inventor: Jennifer Elaine LeBlanc-Dear, Zachary, LA (US)

(*) Notice: Subject to any disclaimer, the term of this patent is extended or adjusted under 35 U.S.C. 154(b) by 504 days.

(21) Appl. No.: 16/616,429

(22) PCT Filed: May 26, 2018

(86) PCT No.: PCT/US2018/034787
§ 371 (c)(1),
(2) Date: Nov. 22, 2019

(87) PCT Pub. No.: WO2018/218235
PCT Pub. Date: Nov. 29, 2018

(65) Prior Publication Data
US 2020/0172254 A1 Jun. 4, 2020

Related U.S. Application Data

(60) Provisional application No. 62/511,828, filed on May 26, 2017.

(51) Int. Cl.
A62B 1/20 (2006.01)
B64D 25/14 (2006.01)
(Continued)

(52) U.S. Cl.
CPC ............... B64D 25/14 (2013.01); A62B 1/20 (2013.01); B63B 2027/145 (2013.01);
(Continued)

(58) Field of Classification Search
CPC .................. B64D 25/14; A62B 1/20
See application file for complete search history.

(56) References Cited

U.S. PATENT DOCUMENTS 4,013,247 A * 3/1977 Giffin ..................... B64D 25/14
193/25 B
4,339,019 A * 7/1982 Tracy ...................... A62B 1/20
182/47
(Continued)

FOREIGN PATENT DOCUMENTS

GB 2203712 A * 10/1988 ............. B64D 25/14

OTHER PUBLICATIONS

Young, Lee W., PCT Search Report, dated Aug. 24, 2018, PCT/US2018/034787.

Primary Examiner — Tye William Abell
(74) Attorney, Agent, or Firm — Edel Patents LLC; John B. Edel

(57) ABSTRACT

An evacuation system (10) includes an electrically insulating inflatable conveyance (11), which is stowed within, and deployed from, a framework (21) attached to an interior structure (45) or exterior structure (43) of an industrial vehicle (38). The inflatable conveyance (11) preferably has a flexible base (12) affixed to, and dependently supported by, longitudinally disposed closed tubular members (15), and may take the form of a chute that may be configured to function as a slide or as a ladder. The chute may be enclosed with a canopy (17), or may be open but provided with upwardly extending side walls (16). In implementations of a canopy (17), transparent egress windows (19) may be provided. Transversely oriented straps (14) form safety steps and/or hand rails in a "ladder" configuration of the chute.

8 Claims, 8 Drawing Sheets

(51) Int. Cl.
*B63B 27/14* (2006.01)
*B63C 9/22* (2006.01)
*B63C 9/04* (2006.01)
*B64C 1/24* (2006.01)

(52) U.S. Cl.
CPC .......... *B63C 9/22* (2013.01); *B63C 2009/042* (2013.01); *B64C 1/24* (2013.01)

(56) References Cited

U.S. PATENT DOCUMENTS

| | | | | |
|---|---|---|---|---|
| 6,298,970 | B1* | 10/2001 | Targiroff | B64D 25/14 193/25 B |
| 2008/0191097 | A1* | 8/2008 | McDonald | B64D 25/14 244/905 |
| 2009/0008186 | A1* | 1/2009 | Taylor | A62B 1/20 182/48 |

* cited by examiner

EVACUATION SYSTEM

RELATED APPLICATIONS

This application claims priority to, and all available benefit of P. C. T. international patent application No. PCT/US18/34787 filed May 26, 2018 and U.S. provisional patent application Ser. No. 62/511,828 filed May 26, 2017. By this reference, the full disclosures, including the drawings and claims, of P. C. T. international patent application No. PCT/US18/34787 and U.S. provisional patent application Ser. No. 62/511,828 are incorporated herein as though each was now set forth in its entirety.

TECHNICAL FIELD

The present invention relates to industrial vehicle safety. More specifically, the present invention relates to an evacuation system particularly adapted to facilitate safe disembarkation from an industrial vehicle under an electrical hazard concomitant accidental contact between the industrial vehicle and an electrical power source such as, for example, an overhead or buried power transmission line.

BACKGROUND ART

A leading cause of death of, or serious injury to, operators of such industrial vehicles as aerial platforms, bucket trucks, cherry pickers, cranes, dump trucks, excavators, forklifts, loaders, man lifts, reach stackers, straddle carriers, telescopic handlers, and the like is electrocution resulting from accidental contact between the industrial vehicle and an electrical power source such as, for example, an overhead or buried power transmission line. As shown in FIG. 1, this hazard, of course, emanates from the common feature of such industrial vehicles 38 of upwardly extending or earth penetrating appurtenances, such as the depicted hydraulically or otherwise maneuverable shovel 39, which appurtenances are particularly subject to inadvertent contact with overhead or buried power transmission lines. Of course, such industrial vehicles 38 also often operate in environments where an overhead power transmission line may be broken by other activity and fall onto the vehicle 38.

Unfortunately, current authoritative guidelines addressing this persistent hazard are woefully inadequate. To be sure, the first recommended action is simply to take precautions to prevent contact with power transmission lines. In the event that accidental contact is, however, made, the operator is called upon to attempt to break contact and then, failing that, to remain in place within the vehicle 38 until such time as the power line can be de-energized by third party intervention.

In some cases, however, such as when a fire hazard is present or likely or when the causal event has also left the vehicle 38 in a precarious orientation or subject to impact from imminently collapsing structures, the operator must evacuate the industrial vehicle 38 notwithstanding the continuing electrical hazard. In such cases, the authoritative guidance calls for the operator to jump from within the operator compartment 40, without contacting the exterior of the vehicle 38, and to land feet together. Having landed, the operator is to hop or shuffle away from the area while keeping his or her feet together in order to prevent creation of a current path through the operator's body if contact is made on the ground with the power source.

As previously noted, this procedure is flawed. In the first place, many operators will lack the agility necessary to carry out the gymnastics called for, especially when under the stress of a life-threatening emergency. This deficiency, however, is only compounded by the fact that many industrial vehicles 38 of the type for which the described electrical hazards exist comprise expansive means for locomotion 44, thereby making the required jump a long jump. Because the long jump is also generally a high jump, the operator must choose his or her landing, in whatever conditions of weather or darkness may exist, without being able to closely inspect the target for the presence of exposed power transmission lines. In the end, the outcome is often one of chance.

With the deficiencies of the prior art clearly in mind, it is an overriding object of the present invention to improve over the prior art by providing an evacuation system and method by which the operator of an industrial vehicle, having encountered an electrical hazard, may predictably reach safety beyond the presented hazard.

It is a further object of the present invention to provide such an evacuation system and method that is largely independent of the physical condition or agility of the operator.

It is a still further object of the present invention to provide such an evacuation system and method that may be implemented to be readily available to an operator, whether by pre-mounting on an exterior side panel 43 or other structure adjacent to the door 42 or doorway 41 of the vehicle 38, by stowage within the operator compartment 39 of the vehicle 38, or otherwise.

DISCLOSURE OF THE INVENTION

In accordance with the foregoing objects, the present invention—an evacuation system provided for use in the face of an electrical hazard in connection with an industrial vehicle—generally comprises an electrically insulating inflatable conveyance, which is stowed within, and deployed from, a storage and deployment framework attached to or otherwise integrated with an exterior side panel, or other suitable structure, of the industrial vehicle. The electrically insulating inflatable conveyance preferably generally comprises a flexible base affixed to, and dependently supported by, a plurality of longitudinally disposed closed tubular members, and may take the form of a chute that may be configured to function as a slide or as a ladder.

The chute may be enclosed with a canopy, or may be open but provided with upwardly extending side walls. In implementations of a canopy, preferably transparent egress windows may be provided. In any implementation, transversely oriented straps may be provided along the flexible base to form safety steps and/or hand rails in a "ladder" configuration of the chute.

The evacuation system for safely disembarking an industrial vehicle in the face of a power line electrocution hazard may be characterized as an electrically insulating inflatable conveyance; a mounting system adapted to secure the inflatable conveyance to an industrial vehicle in a first position for stowage and in a second position for deployment; and a conveyance inflation system adapted to extend the inflatable conveyance to create a pathway from within an interior space of the industrial vehicle to a location adjacent the industrial vehicle. The pathway may take the form of a chute, functioning as a slide and/or a ladder, and may be provided with a cover, which may have windows that can be selectively removed or otherwise opened. The first and second positions may each be locations exterior an operator compartment of the industrial vehicle or may each be positions locations interior the operator compartment of the industrial vehicle.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

BEST MODE FOR CARRYING OUT THE INVENTION

Although those of ordinary skill in the art will readily recognize many alternative embodiments, especially in light of the illustrations provided herein, this detailed description is exemplary of the preferred embodiment of the present invention—an evacuation system provided for use in the face of an electrical hazard in connection with an industrial vehicle, the scope of which is limited only by the claims appended hereto.

Figure 1:
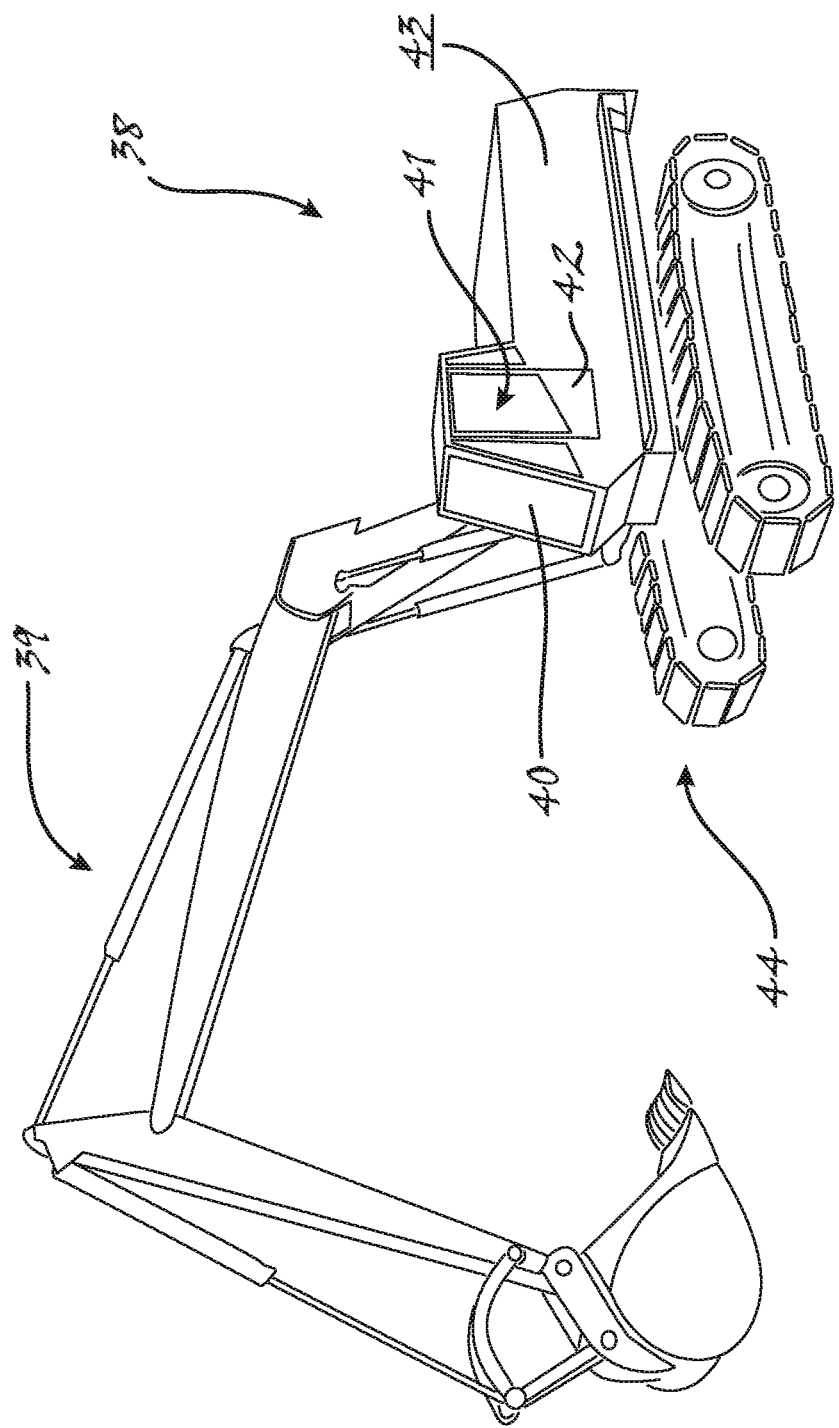
FIG. 1 shows, in a perspective view, a typical industrial vehicle of the type or nature likely to inadvertently contact above ground or buried electrical power lines, such as is generally known in the prior art and ready for improvement in accordance with the teachings of the present invention.
Figure 2:
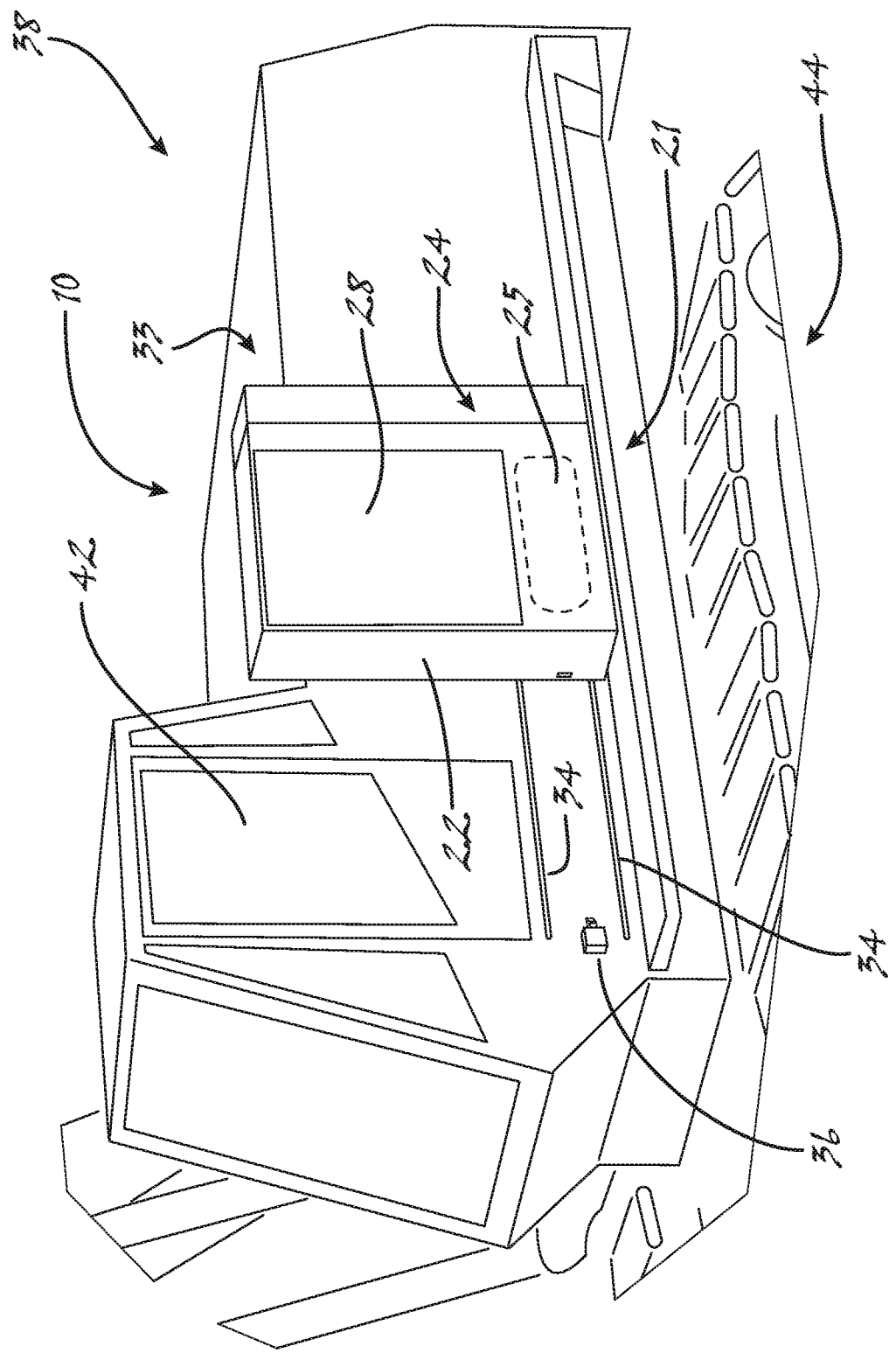
FIG. 2 shows, in a partially cut away perspective view generally corresponding to the view of FIG. 1, various aspects of the provision of an evacuation system, implemented in accordance with the present invention, for use in connection with an industrial vehicle.
Figure 3:
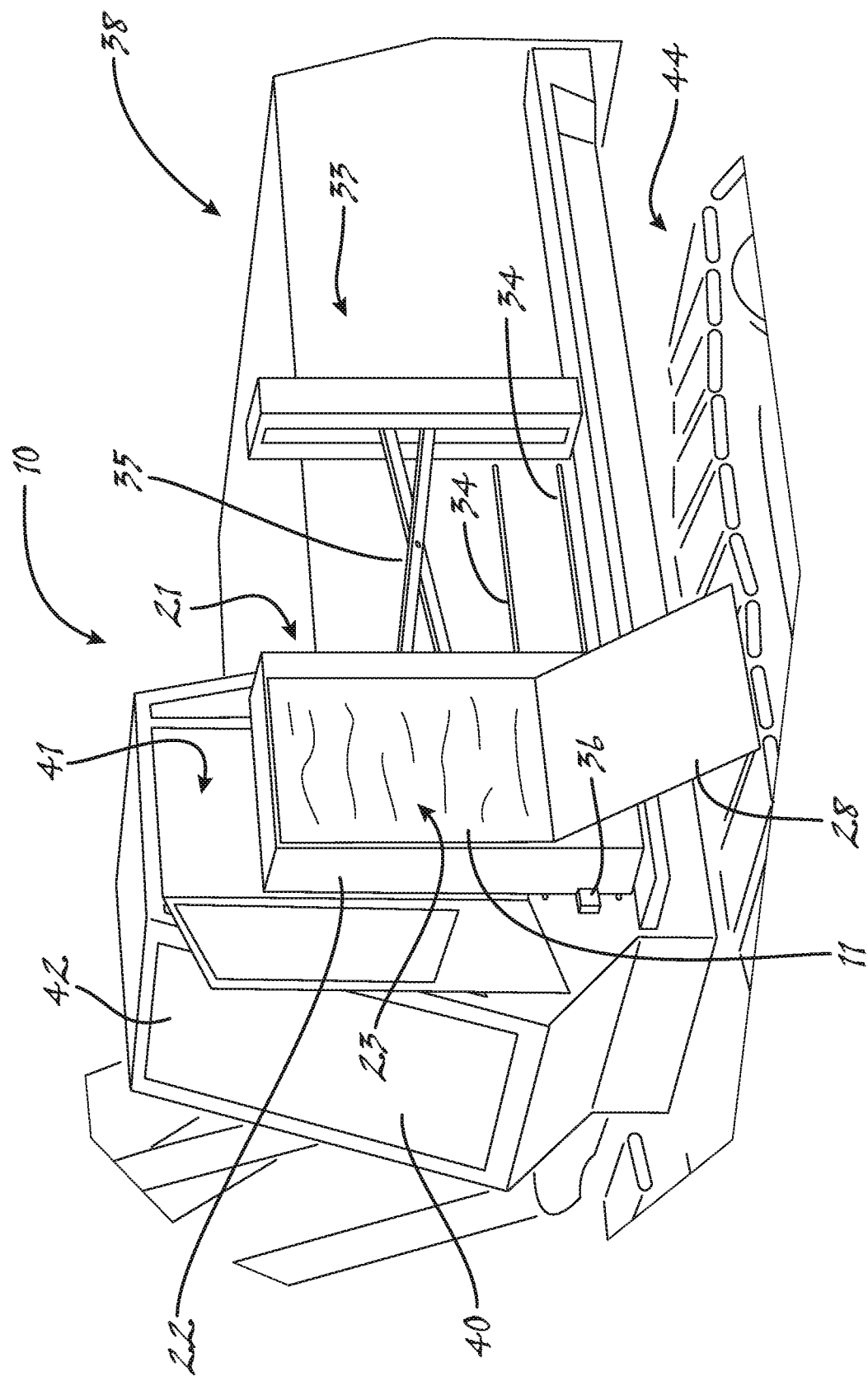
FIG. 3 shows, in a partially cut away perspective view corresponding to the view of FIG. 2, various additional details of the evacuation system of FIG. 2, including details of the system during its deployment.
Figure 4:
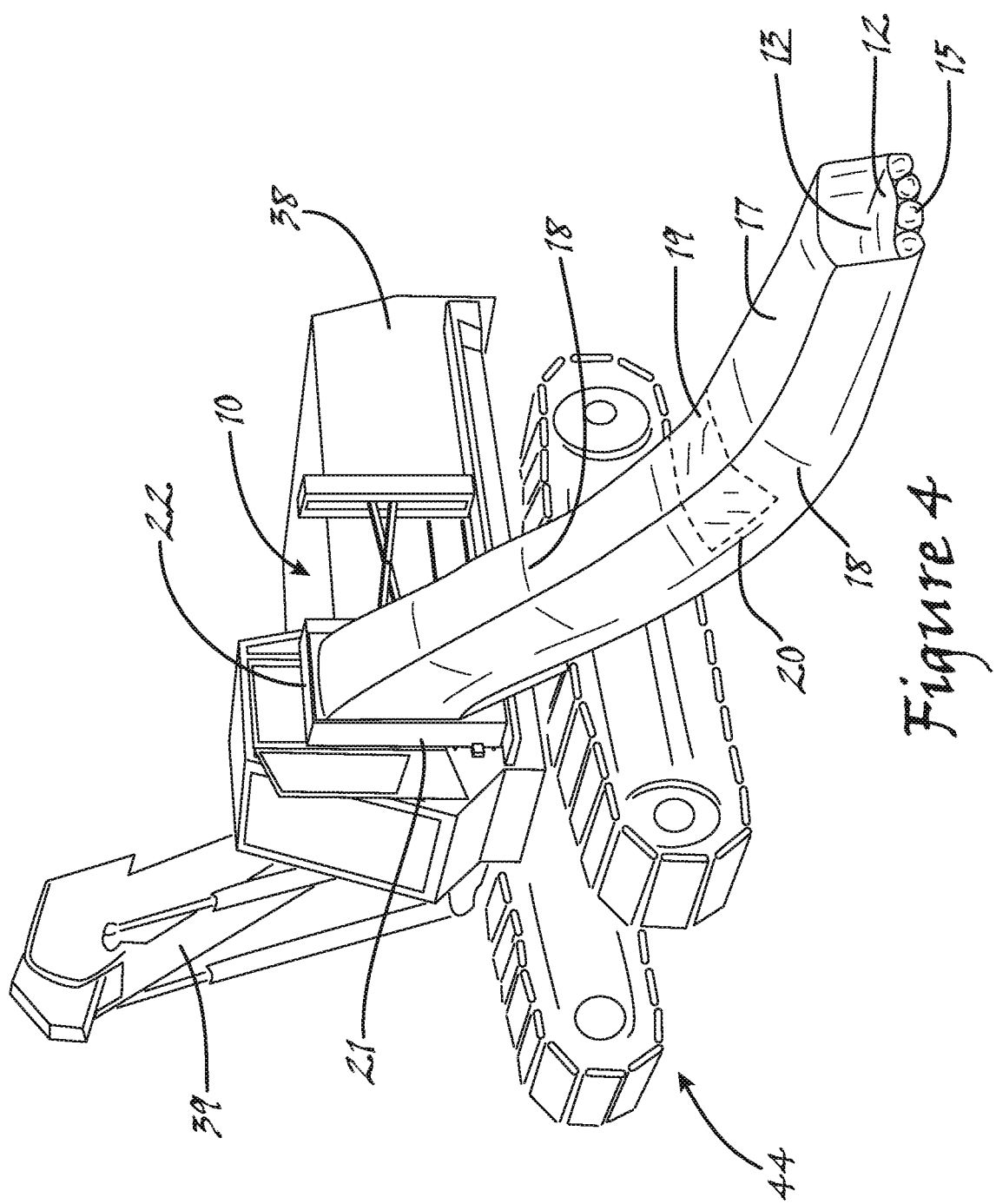
FIG. 4 shows, in a partially cut away perspective view generally corresponding to the view of FIG. 1, details of the evacuation system of FIG. 2, as fully deployed for use by an evacuating operator.
Figure 5:
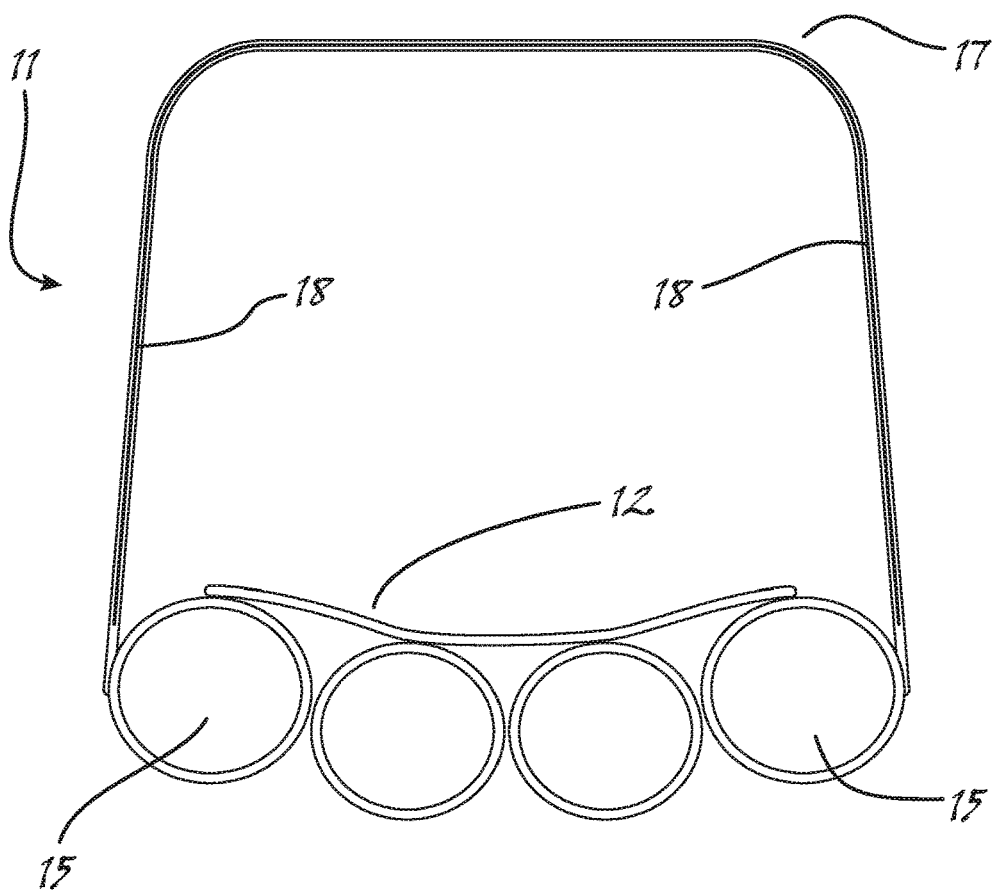
FIG. 5 shows, in a cross-sectional view, various aspects of an electrically insulating inflatable conveyance, as forms an integral component of the evacuation system of FIG. 2.
Figure 8:
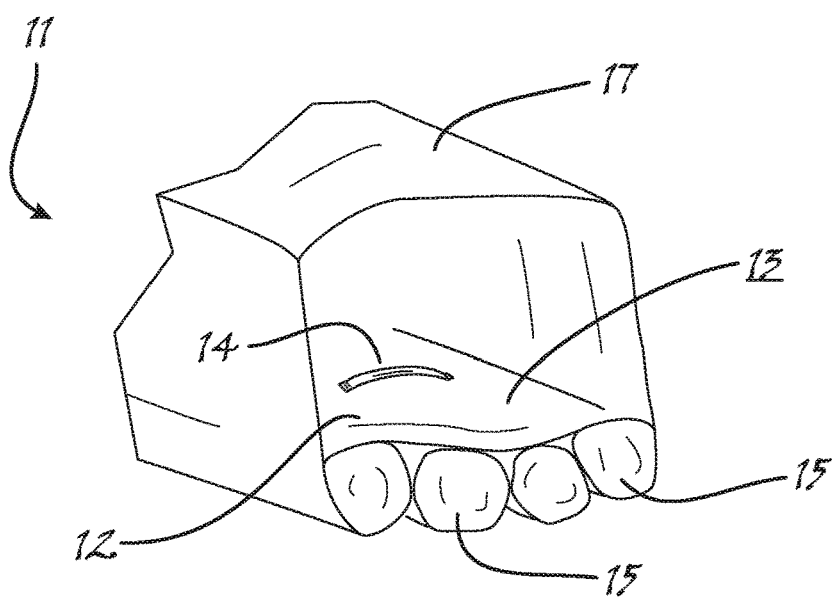
FIG. 8 shows, in a detail view generally corresponding to the view of FIG. 4, an alternative implementation of the flexible base of the electrically insulating inflatable conveyance of the evacuation system of FIG. 2.

Although other implementations within the scope of the present invention are possible, there is shown in the figures, and in FIGS. 2 through 4 in particular, an exemplary preferred implementation of the evacuation system 10 of the present invention, as provided for use in the face of an electrical hazard in connection with an industrial vehicle 38. As shown in the figures, the described exemplary implementation of the evacuation system 10 generally comprises an electrically insulating inflatable conveyance 11, which is stowed within, and deployed from, a storage and deployment framework 21 attached to or otherwise integrated with an exterior side panel 43, or other suitable structure, of the industrial vehicle 38. As shown in FIGS. 4, 5 and 8, in particular, the electrically insulating inflatable conveyance 11 preferably generally comprises a flexible base 12 affixed to, and dependently supported by, a plurality of longitudinally disposed closed tubular members 15. As will be better understood further herein, inflation of the closed tubular members 15 causes the inflatable conveyance 11 to take the form of the depicted chute, which, as also will be better understood further herein, may be configured to function as a slide or a ladder.

In accordance with the exemplary implementation, the storage and deployment framework 21 comprises an encasement 22 forming an interior compartment 23 within which the inflatable conveyance 11 is stored prior to deployment. As will be better understood further herein, the encasement also forms an anchor for the fully deployed inflatable conveyance 11 as well as a secure entryway through which an operator may egress from the operator compartment 40 of the industrial vehicle 38. Additionally, the interior compartment 23 also houses a conveyance inflation system 24, such as may comprise a compressed gas source 25 containing, for example, a highly expansible, nonflammable gas such as liquefied carbon dioxide or a mixture of carbon dioxide and nitrogen. Still further, the interior compartment 23 most preferably also houses deployment mechanisms for initiating and otherwise controlling extension of the inflatable conveyance 11 from within the interior compartment 23 of the encasement 22, as well as the simultaneous or immediately subsequent inflation the inflatable conveyance 11.

As particularly shown in FIGS. 2 and 3, a mounting and positioning mechanism 33 may be implemented to affix the storage and deployment framework 21 to the exterior side panel 43, or other suitable structure, of the industrial vehicle 38, as well as to "automatically" position the storage and deployment framework 21 for immediate use by an evacuating operator. As shown in the figures, an exemplary storage and deployment framework 21 comprises tracks 34 affixed to the exterior side panel 34 of the industrial vehicle 38 and arranged and otherwise adapted to slidingly receive therein a plurality of glides 30 provided on the rear (or interior) face 29 of the encasement 22. Upon preferably all mechanical actuation of the deployment sequence, a spring actuated scissor link mechanism 35, or other equivalent preferably mechanical positioning mechanism, is adapted to forcefully translate the encasement 22 from is pre-deployment storage position (shown in FIG. 2) to its deployment position (shown in FIG. 3).

Upon reaching its deployment position as shown in FIG. 3, a latch and trigger mechanism 36 engages with the encasement 22 and is thereby adapted to hold the encasement 22 in position as the electrically insulating inflatable conveyance 11 is deployed. Additionally, however, the latch and trigger mechanism 36 is also most preferably adapted to trigger and otherwise mechanically actuate the deployment sequence, including causing release of an exterior panel 28 of the encasement 22 to expose the extendable portions of the inflatable conveyance 11 housed within the interior compartment 23 of the encasement 22. Likewise, and following release of the exterior panel 28, the latch and trigger mechanism 36 is also most preferably adapted to trigger and otherwise mechanically actuate the conveyance inflation system 24, whereby the longitudinally disposed closed tubular members 15 of the inflatable conveyance 11 are inflated by the compressed gas source 25, resulting in the fully extended configuration as generally depicted in FIG. 4.

As shown in the exemplary implementation of FIGS. 4 and 5, the extended inflatable conveyance 11 takes the form of a chute. As shown in FIG. 4, the top surface 13 of the flexible base 12 may be generally smooth, thereby forming a slide. On the other hand, as particularly shown in FIG. 8, the top surface 13 of the flexible base 12 may be provided with a plurality of transversely oriented straps 14, safety steps and/or hand rails in a "ladder" configuration of the chute. In this latter case, the evacuating operator may make a controlled descent down the chute, taking care not to exit the distal end of the inflatable conveyance 11 into contact with an exposed electrical power transmission line.

Figure 7:
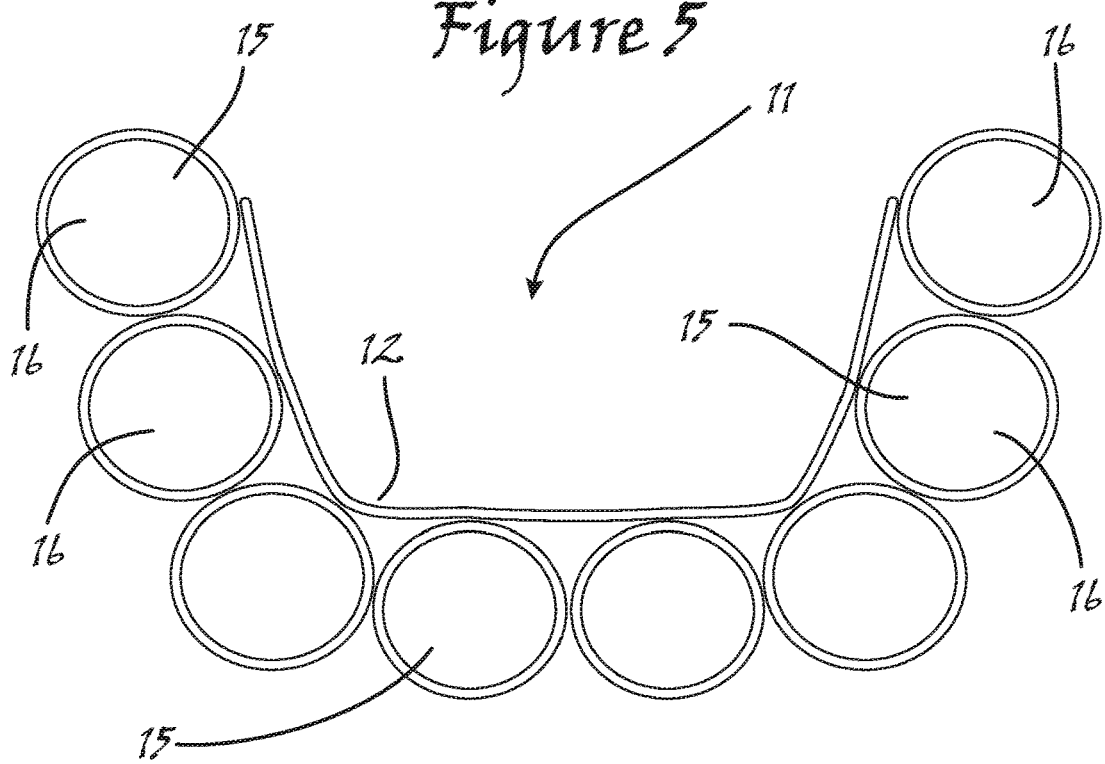
FIG. 7 shows, in a cross-sectional view, various aspects of an alternative implementation of the electrically insulating inflatable conveyance of FIGS. 2 and 5.
Figure 6:
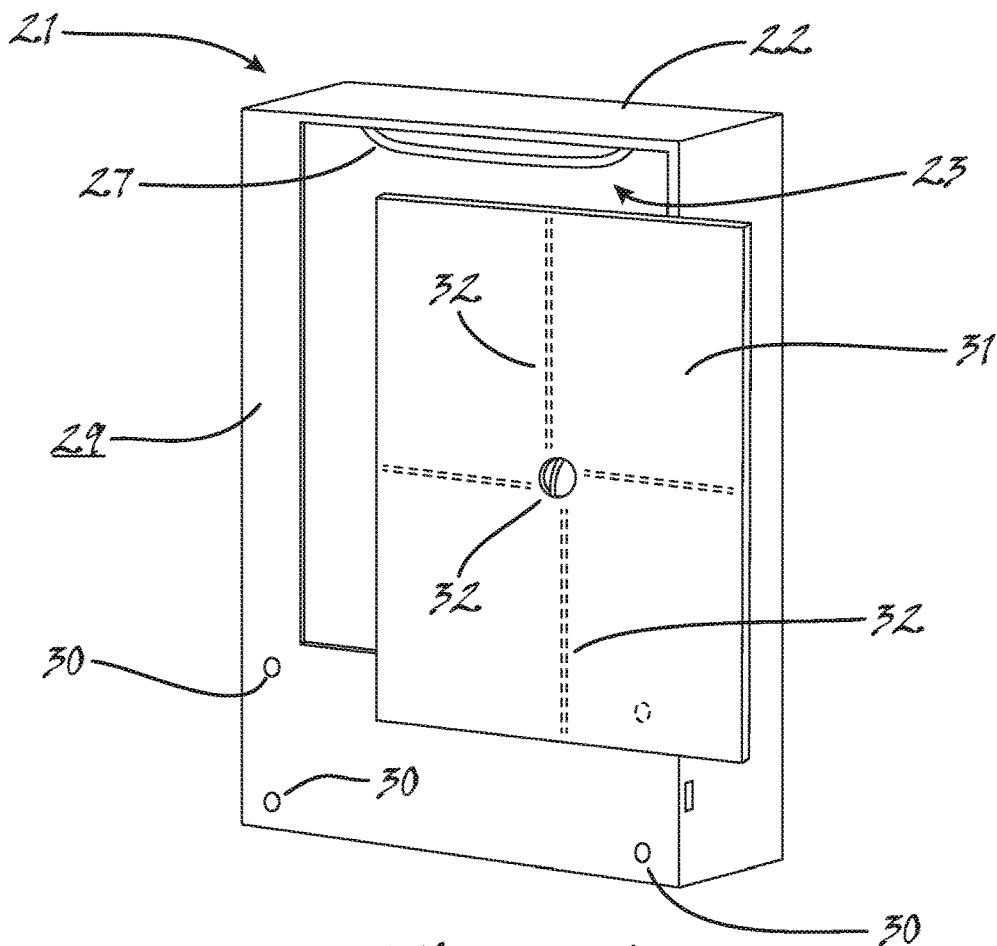
FIG. 6 shows, in a perspective view, the rear (or interior) side of a storage and deployment framework, as forms an integral component of the evacuation system of FIG. 2.

As shown in FIGS. 4, 5 and 8, the inflatable conveyance 11 may be provided with a canopy 17, as may be particularly advantageous in dynamic conditions such as may cause movement of the electrical hazard. In order to maintain an open conduit through the chute, embedded or similarly disposed frame members 18, such as, for example, plastic hoops or other preferably lightweight rigid structures, are provided as depicted in FIGS. 4 and 5. In such implementations, and especially so where transversely oriented straps 14 are also provided, the canopy 17 preferably comprises one or more substantially transparent window sections 19, which most preferably include means for detachment 20. In this manner, an evacuating operator may, while traversing the chute, evaluate the outside environment to locate the safest location for exiting the inflatable conveyance 11 and, having found such a location, may as necessary remove a window section 19 to reach safety. On the other hand, the chute of the electrically insulating inflatable conveyance 11 may be formed in an open configuration as generally depicted in FIG. 7, in which case at least some of the longitudinally disposed closed tubular members 15 are most preferably arranged as side members 16 to provide at least some envelopment of the operator as he or she evacuates the industrial vehicle 38.

In use during an electrical hazard, the operator of the industrial vehicle 38 will generally ensure that any door 42 to the operator compartment 40 is opened or removed, and then will act to secure the encasement 22 in place over and about the doorway 41 to the operator compartment 40. In any case, the electrically insulating inflatable conveyance 11 is then extended, again either automatically or manually, and the operator travels down the resulting chute to safety. In the exemplary implementation heretofore described, the operator will enter the electrically insulating inflatable conveyance 11 by actuating a latch 32 to removed an internal panel 31 over the rear (or interior) face 29 of the encasement, thereby exposing a secure and safe conduit from within the operator compartment 40 to the inflatable conveyance 11. To aid the operator in entry through the exposed conduit, a handrail 27 is most preferably provided at the upper portion of the interior compartment 24 of the encasement 22.

Although the foregoing description generally describes an evacuation system 10 wherein the encasement 22 is secured in place over and about the doorway 41 to the operator compartment 40 in a largely automated process, it should be appreciated that in at least some implementations of the present invention an evacuation system 10 manual positioning is possible. In particular, in implementations of the evacuation system 10 wherein the various components are generally stowed for use within the operator compartment 40, the operator may generally manually position and deploy the various components without risk of electrical shock. In such cases, implementation of the evacuation system 10 may be simplified in complexity in exchange for available interior space within the operator compartment 40.

Figure 9:
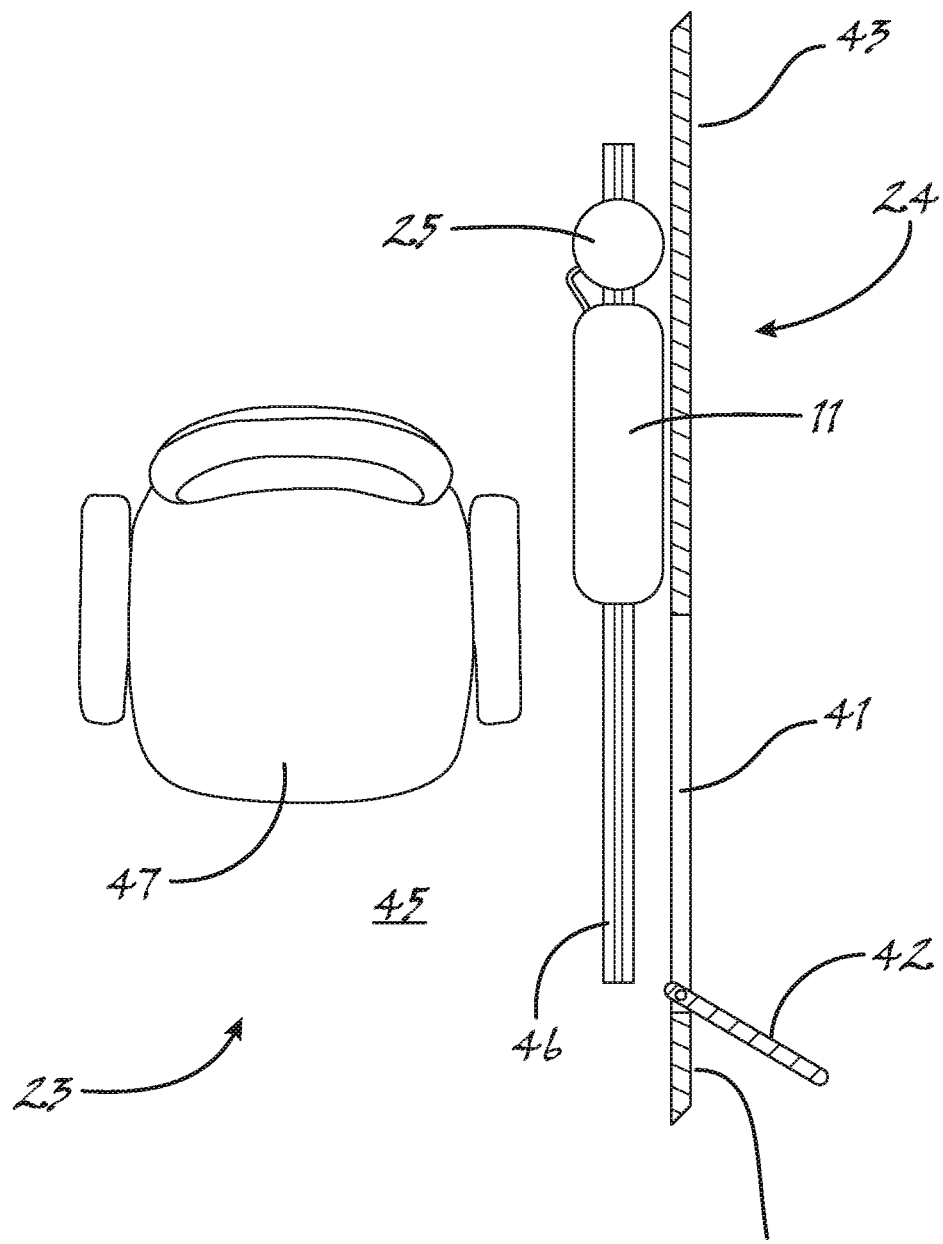
FIG. 9 shows, in a partially cut away top plan view, various details of an alternatively implemented interiorly stowed embodiment of the evacuation system of the present invention.
Figure 10:
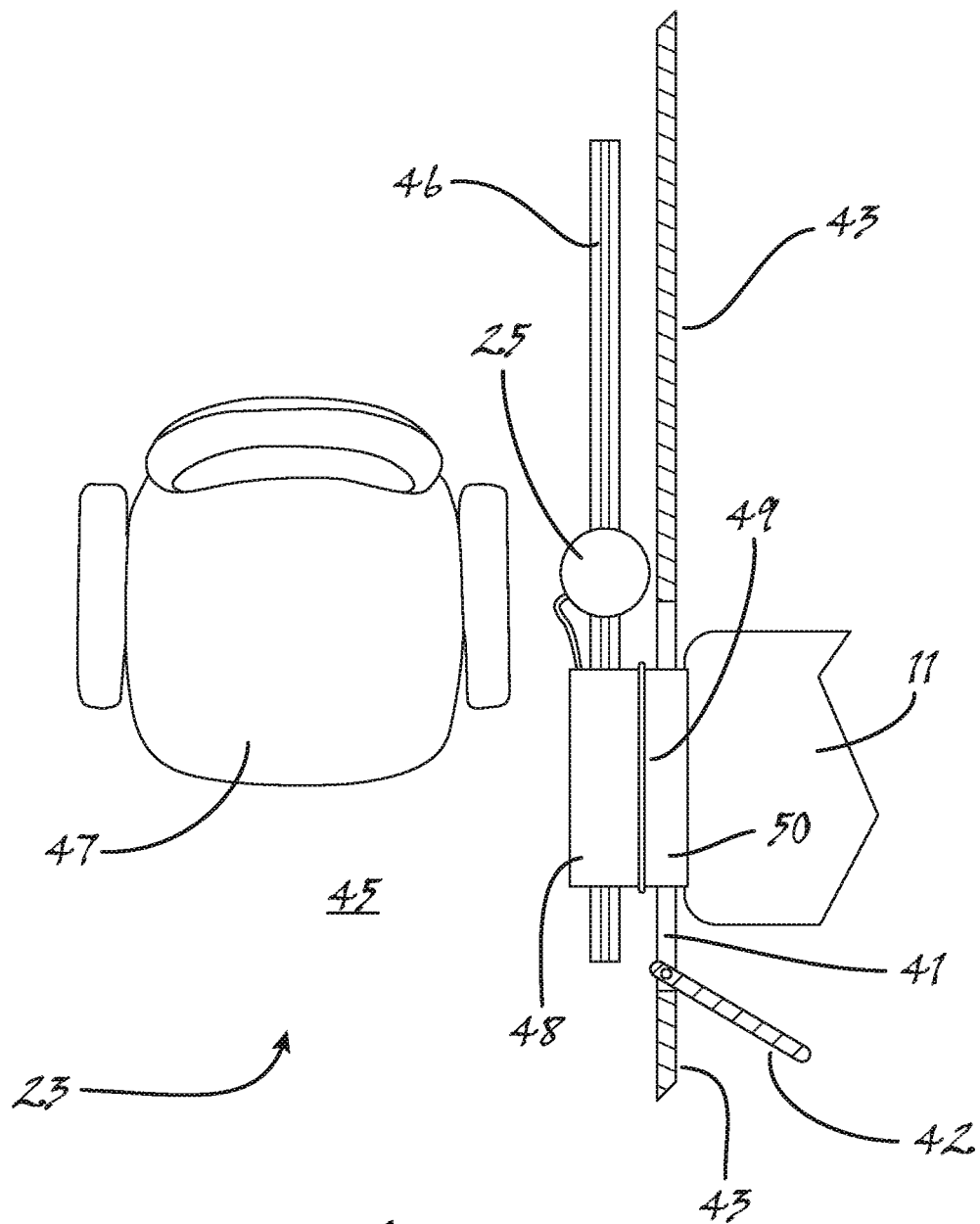
FIG. 10 shows, in a partially cut away top plan view generally corresponding to the view of FIG. 9, additional details of the alternatively implemented interiorly stowed evacuation system of FIG. 9.

As particularly shown in FIGS. 9 and 10, an exemplary "interiorly" disposed evacuation system 10 may be implemented by slidingly mounting an electrically insulating inflatable conveyance 11 on an interiorly mounted track 46. As shown in the figures, such a track 46 may be conveniently affixed to the floor 45 of the operator compartment 40 in the area between the operator's chair 47 and the exterior side panel 23 of the industrial vehicle. Because the various components of the depicted implementation are all stowed within the interior space of the operator compartment 40, the operator may, in an electrical emergency, manually deploy the evacuation system 10.

As shown in FIG. 10, the operator deploys the depicted embodiment of the evacuation system 10 by sliding the inflatable conveyance 11 and associated components of the conveyance inflation system 24 into place adjacent the doorway 41 of the industrial vehicle. To this end, at least the inflatable conveyance 11 is preferably carried on a glide 48 operatively adapted to slide on the track 46. An anchor 50 securing the inflatable conveyance 11 to the glide 48 is affixed to the glide 48 via a provided hinge 49, whereby the operator simply pushes on and rotates the inflatable conveyance through and out the open doorway 41. The operator then actuates the inflation system 24 to inflate the inflatable conveyance 11 as depicted in FIG. 10.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and the claims drawn hereto. For example, those of ordinary skill in the art will recognize that some or all of the operational steps of the interiorly stowed evacuation system 10 may, with the addition of some complexity, be implemented to be mechanically or otherwise automated. In any case, because the scope of the present invention is much broader than any particular embodiment, the foregoing detailed description should not be construed as a limitation of the present invention, which is limited only by the claims appended hereto.

INDUSTRIAL APPLICABILITY

The present invention is applicable to industrial vehicle safety.

What is claimed is:
1. An evacuation system for safely disembarking an industrial vehicle in the face of a power line electrocution hazard, said evacuation system comprising;
an electrically insulating inflatable conveyance;
a mounting system, said mounting system being adapted to secure said inflatable conveyance to an industrial vehicle in a first position for stowage and in a second position for deployment; and
a conveyance inflation system adapted to extend said inflatable conveyance to create a pathway from within an interior space of the industrial vehicle to a location adjacent the industrial vehicle; and wherein:

said first position is adjacent to a door of an operator compartment of the industrial vehicle;

said second position is aligned with a doorway of the door of the operator compartment;

said inflatable conveyance is configured as a chute after inflation;

said chute comprises a cover;

said chute comprises a first operator exit opposite the operator compartment;

said cover comprises a window; and said window opens to form a second operator exit between the first operator exit and the operator compartment.

2. The evacuation system as recited in claim 1, wherein said chute is configured as a ladder.

3. The evacuation system as recited in claim 1, wherein said first position and second position are each in locations exterior to an operator compartment of the industrial vehicle.

4. The evacuation system as recited in claim 1, wherein said first position and second position are each in locations interior to an operator compartment of the industrial vehicle.

5. The evacuation system as recited in claim 1 wherein the chute comprises a plurality of longitudinally disposed closed tubular members below the pathway.

6. The evacuation system as recited in claim 1 wherein the chute comprises a plurality of closed tubular members below the pathway.

7. The evacuation system as recited in claim 1, wherein said chute functions as a slide.

8. The evacuation system as recited in claim 7, wherein said chute is configured as a ladder.

\* \* \* \* \*